(12) United States Patent
Shufer et al.

(10) Patent No.: US 8,789,039 B2
(45) Date of Patent: Jul. 22, 2014

(54) METHOD AND SYSTEM OF INSTALLING A PROGRAM ON A FIRST COMPUTER, AND DUPLICATING THE INSTALLATION ON A SECOND COMPUTER

(75) Inventors: Ilan Shufer, Tel Aviv (IL); Alexei Ledenev, Nes-Ziona (IL); Hilik Paz, Ramat Gan (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1573 days.

(21) Appl. No.: 12/239,373

(22) Filed: Sep. 26, 2008

(65) Prior Publication Data
US 2010/0083058 A1   Apr. 1, 2010

Related U.S. Application Data

(60) Provisional application No. 61/060,832, filed on Jun. 12, 2008.

(51) Int. Cl.
*G06F 9/445* (2006.01)
(52) U.S. Cl.
USPC .......................................................... 717/177
(58) Field of Classification Search
CPC ................ G06F 8/60; G06F 8/61; G06F 8/62
USPC ........................................................ 717/174
See application file for complete search history.

(56) References Cited

U.S. PATENT DOCUMENTS

| 5,742,778 | A  | * | 4/1998  | Hao et al. ...................... 715/759 |
| 5,974,258 | A  | * | 10/1999 | Ferri et al. .................... 717/178 |
| 6,202,070 | B1 | * | 3/2001  | Nguyen et al. ...................... 1/1 |
| 6,526,524 | B1 | * | 2/2003  | Kelley ......................... 714/38.1 |
| 7,007,274 | B1 | * | 2/2006  | Patel et al. ..................... 717/176 |
| 7,228,526 | B2 | * | 6/2007  | Cohen et al. .................. 717/114 |
| 7,707,559 | B2 | * | 4/2010  | Reddy .......................... 717/131 |
| 2004/0205715 | A1 | * | 10/2004 | Taylor .......................... 717/120 |
| 2007/0276938 | A1 | * | 11/2007 | Ottamalika et al. .......... 709/224 |
| 2009/0199274 | A1 | * | 8/2009  | Frazier et al. ..................... 726/4 |
| 2009/0290483 | A1 | * | 11/2009 | Curtis et al. .................. 370/216 |

* cited by examiner

*Primary Examiner* — Li B Zhen
*Assistant Examiner* — Joanne Macasiano

(57) ABSTRACT

Installing a program on a first or primary computer system, and duplicating the installation on a second or secondary computer system. At least some of the illustrative embodiments are methods comprising installing a software program on a first computer system by way of a human interacting with the first computer system (the installing by way of a plurality of operations), programmatically duplicating each operation on a second computer system coupled to the first computer system (the duplicating of each operation on the second computer system in real time with each operation on the first computer system), programmatically analyzing a result of each operation on the first computer system against a result of each operation on the second computer system, and notifying the human (by way of the first computer system) when the result of the operation on the second computer system is unexpected.

13 Claims, 4 Drawing Sheets

METHOD AND SYSTEM OF INSTALLING A PROGRAM ON A FIRST COMPUTER, AND DUPLICATING THE INSTALLATION ON A SECOND COMPUTER

CROSS REFERENCE TO RELATED APPLICATIONS

This Application claims the benefit of U.S. provisional patent application Ser. No. 61/060,832, filed Jun. 12, 2008, titled "Method And System Of Installing Program On A First Computer, And Duplicating The Installation On A Second Computer", which application is hereby incorporated by reference herein as if reproduced in full below.

BACKGROUND

At many points in the lifetime of a computer system, various pieces of software are deployed and configured. For example, new application programs may be installed, upgrades of existing application may be installed, security updates may be installed, and configuration settings applied and/or changed (e.g., opening a communication port in a firewall program). As an information technology administrator, installing duplicate copies of a program on a small number of computer systems (e.g., 5 or less) is, in most cases, best performed by installing the program one at a time on each computer system. However, some "server farms" may comprise many tens or even hundreds of computer systems acting as servers, and when a program needs to be installed on every computer system in the server farm, individually installing on each server is an enormous task. While products exist to assist server farm-wide deployment, such products require a high degree of skill to use, and are inflexible to dissimilarities between the computer systems. Moreover, such tools are very difficult to use in the case of configuration changes to existing software, and even when such programs can be used the programs nevertheless require a high degree of skill to utilize and significant advanced planning.

BRIEF DESCRIPTION OF THE DRAWINGS

For a detailed description of exemplary embodiments, reference is now made to the accompanying drawings in which.

NOTATION AND NOMENCLATURE

Figure 1:
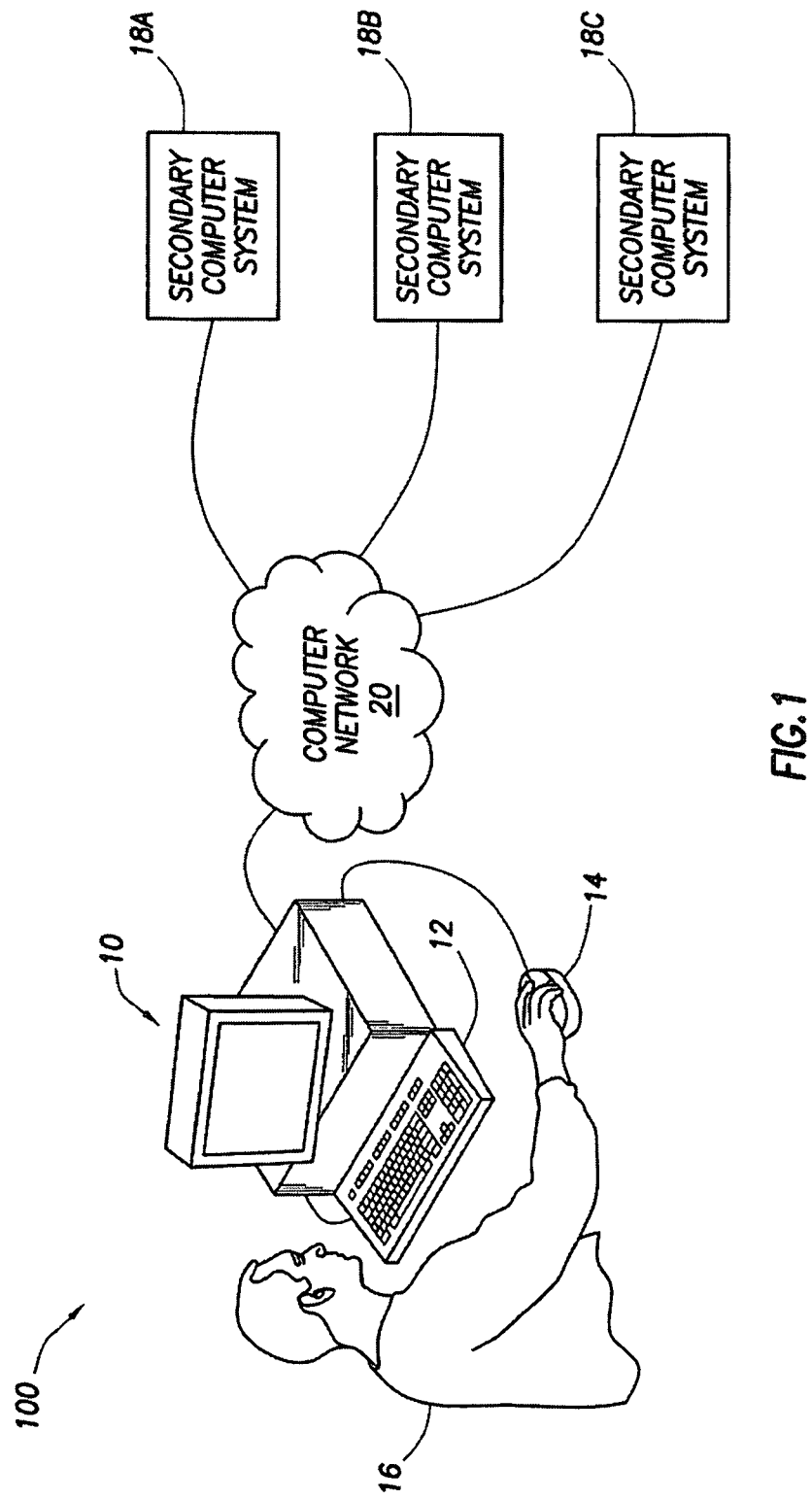
FIG. 1 shows system in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection.

An amount of time taken to recognize an action or operation performed on a first computer system, to transmit a message across a computer network to a second computer system, and to perform the duplicate action/operation on the second computer system shall not negate that the action/operation on the first computer system takes place in "real time" or "substantially simultaneously" with the duplicate-action/operation on the second computer system.

"Programmatically" shall mean that the operation or function is performed by a program executing on a computer system.

"Installation" and "installing" shall mean not only new installations of a program on a computer system, but also upgrades and changes (e.g., newer versions, security patches, configuration changes, placing files on a system) to programs previously installed on a computer system.

"Duplicating" or "performing a duplicate operation" as between a plurality of computer systems shall mean performing the same underlying operation on each of the plurality of computer systems; however, the fact that the underlying operation on each computer system may require computer system-specific data (e.g., machine network name, machine Internet Protocol (IP) address, product key number) shall not negate that the operations are duplicates.

"Interaction" and "interacting" as between a human and software under installation shall mean the human observes the user interface(s) presented during installation, and the human acts and/or reacts to the user interface(s). The interaction need not necessarily be by way of a keyboard, mouse and/or monitor directly attached to the computer system on which the software is being installed, and indeed the human may still have "interaction" remotely by way of a remote console session. Remotely accessing the primary computer system is distinguishable from the duplication on the secondary computer systems by the fact that the computer system through which the human interacts with the primary computer system is not also installing the software under installation.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to systems and methods for substantially simultaneously installing software across a plurality of computer systems. Inasmuch as a system for installing software likewise uses software to perform the installation, the software installed will be referred to as "software under installation," and the software used to facilitate the installation will be referred to as "installation replication software." However, the installation replication software does more than just replicate, so reference to "installation replication software" should not be construed to limit the functionality.

FIG. 1 illustrates a system 100 in accordance with at least some embodiments. In particular, the system comprises a primary computer system 10. The primary computer system 10 of these embodiments has a keyboard 12 and mouse 14 that enable a human 16 to interact with the software under installation and installation replication software, both executed by the primary computer system 10. The primary computer system 10 couples to a plurality of secondary computer systems 18 by way of a computer network 20. While only three secondary computer systems 18 are shown in FIG. 1, any number may be present (e.g., tens or hundreds of computers in a server farm). In accordance with at least some embodiments, each of the secondary computer systems 18 are to have installed a duplicate copy of the software under installation, and likewise each secondary computer system 18 executes a version of the installation replication software.

Figure 2:
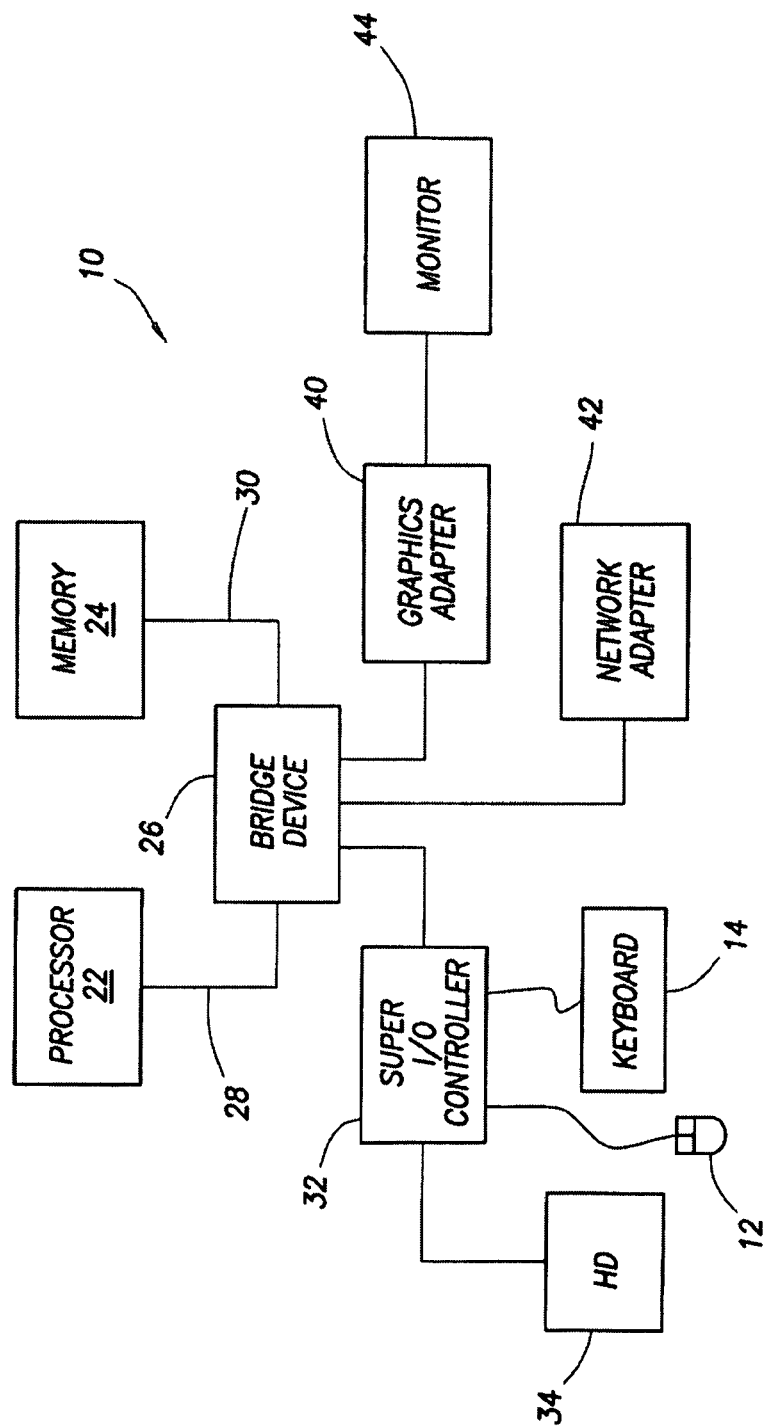
FIG. 2 shows a computer system in accordance with at least some embodiments.

FIG. 2 shows an illustrative primary computer system 10 in greater detail. In particular, primary computer system 10 comprises a processor 22 coupled to a memory device 24 by way of a bridge device 26. Although only one processor 22 is shown, multiple processor systems, and systems where the "processor" has multiple processing cores, may be equivalently implemented. The processor 22 couples to the bridge device 26 by way of a processor bus 28 and the memory 24 couples to the bridge device 28 by way of a memory bus 30. Memory 24 is any volatile or non-volatile memory device, or array of memory devices, such as random access memory (RAM) devices, dynamic RAM (DRAM) devices, static DRAM (SDRAM) devices, double data rate DRAM (DDR DRAM) devices, or magnetic RAM (MRAM) devices.

The bridge device 26 comprises a memory controller that asserts control signals for reading and writing the memory 24, the reading and writing both by processor 22 and by other devices coupled to the bridge device 26 (i.e., direct memory access (DMA)). The memory 24 is the working memory for the processor 22, which stores programs executed by the processor 22 and which stores data structures used by the programs executed on the processor 22. In some cases, the programs held in memory 24 are copied from other devices (e.g., hard drive 34, discussed below) prior to execution.

Bridge device 26 not only bridges the processor 22 to the memory 24, but also bridges the processor 22 and memory 24 to other devices. For example, illustrative primary computer system 10 comprises a super input/output (I/O) controller 32 which interfaces various I/O devices to the computer system. In the illustrative primary computer system 10, the super I/O controller 32 enables coupling and use of a non-volatile memory device 34 (such as a hard drive (HD)), a pointing device or mouse 14, and a keyboard 12. The super I/O controller 32 may also enable use of other device not specifically shown (e.g., compact disc read only memory (CDROM) drives, Universal Serial Bus (USB) ports), and is referred to as "super" because of the many I/O devices for which it enables use. In alternative embodiments, the human 16 may remotely interact with the primary computer system 10 (e.g., the primary computer system is a blade server in a rack of servers), and in such cases the primary computer system may omit the keyboard 14 and mouse 12.

Still referring to FIG. 2, the bridge device 26 further bridges the processor 22 and memory 24 to other devices, such as a graphics adapter 40 and network adapter 42. Graphics adapter 42, if present, is any suitable graphics adapter for reading display memory and driving a monitor 44 with the graphics images represented in the display memory. In some embodiments, the graphics adapter 40 internally comprises a memory area to which graphics primitives are written by the processor 22 and/or by way of DMA writes between the memory 24 and the graphics adapter 40. The graphics adapter 40 couples to the bridge device by way of any suitable bus system, such as peripheral components interconnect (PCI) bus or an advanced graphics port (AGP) bus. In some embodiments, the graphics adapter 40 is integral with the bridge device 26.

Network adapter 42 enables the primary computer system 10 to communicate with other computer systems over a computer network. In some embodiments, the network adapter 42 provides access to a local area network (LAN) or wide area network (WAN) by way of hardwired connection (e.g., Ethernet network), and in other embodiments the network adapter 42 provides access to the LAN or WAN through a wireless networking protocol (e.g., IEEE 802.11(b), (g)). In yet still other embodiments, the network adapter 42 provides access to the Internet through a wireless broadband connection, such as a cellular-based wireless broadband Internet connection. Thus, the secondary computer systems 18 may be locally coupled (i.e., within a few feet), or may be many miles from the primary computer system 10.

While FIG. 2 is discussed in reference to primary computer system 10, the description is equally applicable to any of the secondary computer systems 18. In situations where the primary or secondary computer systems are servers in a server farm, the computer systems may omit devices such as the keyboard, mouse and monitor, and in some embodiments the computer systems may implement differing hardware configurations from the primary computer system 10.

Returning again to FIG. 1. In installing software in accordance with the various embodiments, the primary computer system 10 loads and executes the installation replication software. Each of the secondary computer systems 18 likewise load and execute a version of the installation replication software. After the human 16 has the installation replication software running on the primary computer system 10 and the secondary computer systems 18, the human 16 begins installation of the software under installation on primary computer system 10. As the human 16 performs the various steps and/or interacts with the software under installation on primary computer system 10, the installation replication software executed on primary computer system 10 records or otherwise creates a representation of each interaction or operation. For example, if the human 16 commands the primary computer system to download the software under installation from a particular website, and place the downloaded files in a particular directory, the installation replication software copies or otherwise creates a representation of the interaction (e.g., the website name or IP address, the file name, and the target location). The installation replication software then sends the representation of the interaction to each of the secondary computer systems. Once received, each of the secondary computer systems 18 programmatically applies the operation or interaction its respective secondary computer system 18. Stated otherwise, the installation replication software performs the operating on secondary computer systems 18 and/or the software under installation on the secondary computer systems in response to the representation of the interaction on the primary computer system 10. In accordance with at least some embodiments, the interaction of the human 16 with the software under installation, and the corresponding programmatic duplication on each of the secondary computer systems 18, takes place in real time.

With respect to creating the representations of interaction, in some embodiments the representation of interactions provide absolute tracking of mouse position, mouse button assertion and keyboard entries. Considered from the aspect of the receiving installation replication software on the secondary computer systems 18, a series of mouse movements, mouse button assertions and/or keyboard entries are received, and those movements, assertions and entries are duplicated exactly on the secondary computer systems 18.

In other embodiments, the installation replication software on the primary computer system 10 delves into the executing code and/or data structures of the software under installation, and thus the representations of interactions may specifically identify the features of the graphical user interface with which the human interacts without tracking mouse movements. The receiving installation replication software likewise then need not strictly duplicate mouse movements, but nevertheless duplicates the interactions taken by a more explicit interaction with the software under installation on the secondary computer systems 18. Moreover, using representations of interactions that are not absolute mouse movements enables the secondary computer systems to interact with their respective software under installation even when the user interface as between the primary computer system and the secondary computer systems 18 differ (e.g., different display memory area, pop-up window spawns to different location on the secondary computer systems). Several commercially available computer program exist which have the ability to locate graphical user interface features (e.g., text entry boxes, check boxes and push buttons) at different locations on the screen from the original interaction, and to recreate interaction at the differing locations on other computer systems. One such commercially available product is Quick Test Professional available from Hewlett-Packard Company, Palo Alto, Calif. However, operation of products such as the Quick Test Professional involves recording an entire interaction session between the human and particular software to create a test script, and then applying the recorded test script again on the same computer system or different computer systems at a later time. Stated otherwise, each interaction in a series of interactions is not sent in real time to the secondary computer systems in the Quick Test Professional-type products.

With respect to the software under installation on the primary computer system 10, in accordance with the various embodiments the human 16 is responsible for checking for expected operation. However, the installation replication software executed on the primary computer system 10 analyzes the result of each specific interaction, and creates a representation of the result of the interaction. Likewise, the versions of the installation replication software on the secondary computer systems 18 create a representation of the result of the programmatic interaction on their respective secondary computer systems 18. In accordance with some embodiments, each secondary computer system 18 sends its respective representation of the result of the programmatic interaction to the primary computer system 10. The installation replication software on the primary computer system 10 analyzes the representation of the result of the interaction on the primary computer system against the representation of the result from each of the secondary computer systems, and alerts the human tester 16 when the result of the interaction on the secondary computer system 18 was unexpected.

In alternative embodiments, the primary computer system 10 sends the representation of the results to the each of the secondary computer systems 18, and the secondary computer systems are tasked with analyzing the representation of the results from the primary computer system 10 against the results from the programmatic interaction on their respective computer systems. In these embodiments, each secondary computer system 18 sends an indication to the primary computer system 10 when the analysis reveals unexpected results. Several commercially available computer programs exist which have the ability to compare results of interactions with user interfaces. One such commercially available product is Quick Test Professional noted above. Again, however, operation of products such as the Quick Test Professional involve testing software functionality by recording an entire interaction session between the human tester and the software under test to create a test script, and then applying the recorded test script again on the same machine or other machines at a later time. Thus, the analysis of results in such a situation is not comparing results created by interactions in real time, but instead involves comparing current results against results obtained in a previous recording session. Stated otherwise, even though such programs have the ability to compare results of interactions with user interfaces, results of each interaction in a series of interactions are neither sent in real time to/from secondary computer systems, nor is an analysis made in real time as to whether the results were unexpected.

Figure 3:
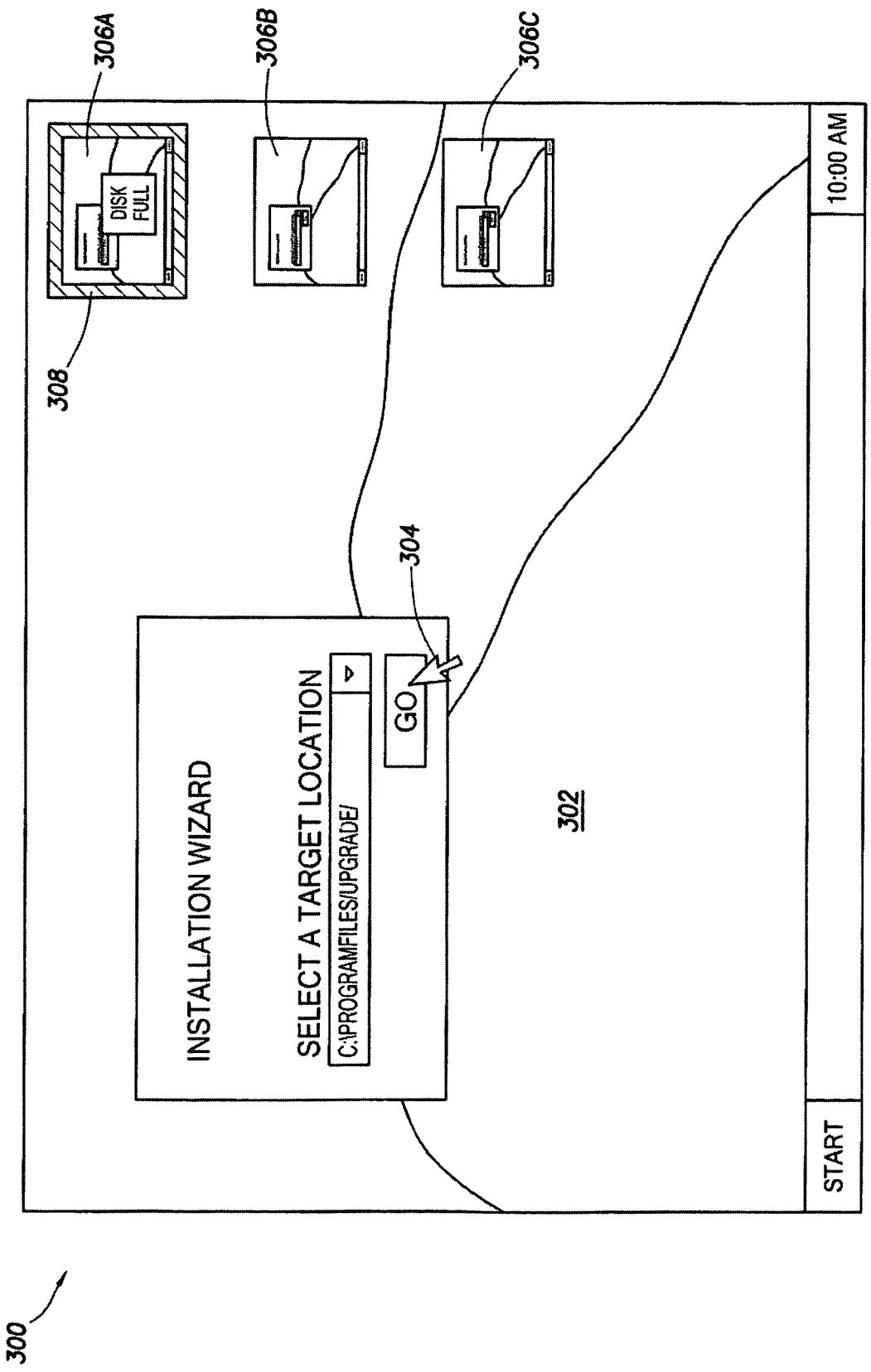
FIG. 3 shows a user interface on a primary computer system in accordance with at least some embodiments.

FIG. 3 illustrates a user interface 300 of the primary computer system 10 as may be viewed by the human 16. In particular, the user interface 300 comprise a graphical user interface 302 of the primary computer system 10, with which human interacts, such as by way of mouse icon 304. In accordance with some embodiments, duplicate copies of the user interfaces of the secondary computer systems 18 are likewise shown in reduced resolution (i.e., thumb-nails), such as reduced resolution copies 306. For a limited number of secondary computer systems (e.g., 20 or less), the reduced resolution copies may be displayed continuously during the parallel installation process. When the reduced resolution copies are displayed continuously, the human may be alerted or notified of unexpected results on a particular secondary computer system, such as by outlining the copy for the particular secondary computer system in a predetermined color border 308 (e.g., red). The human may then address the unexpected result by expanding the user interface to a larger size (e.g., by "clicking" on the reduced resolution copy). In embodiments where a significant number of secondary computer systems are used (e.g., every server in a server farm having 100 computer systems), the reduced resolution copies of the user interfaces may only appear when expected results occur, or when specifically directed to appear by the human 16.

Still referring to FIG. 3, consider as an example that the human 16 interacts with primary computer system 10 using the user interface 302 to set a home location for the software under installation to a particular location on hard drive "C:\". On one of the secondary computer systems, in this case the secondary computer system whose user interface is duplicated in thumb-nail 306A, the "C:\" drive has insufficient free space, resulting in a pop-up window indicated insufficient drive space. The installation replication software notifies or alerts the human 16, by way of the primary computer system 10, that an unexpected result occurred on the secondary computer system represented by the reduced resolution interface 306A. In the illustrative embodiments of FIG. 3, the notification is by way of a color border 308, and in other illustrative embodiments the notification is by way of having the reduced resolution interface 306A appear on the user interface 302. Other mechanism to alert the human 16 may be equivalently used. The human 16 may then, through the primary computer system 10, trigger a remote console session to the secondary computer system 18 to view the results to determine the cause of the unexpected result. Moreover, through the remote console session the human 16 may correct the shortcoming. In the illustrative case of the hard drive having insufficient free space, the human 16 may either delete files to free the space, or select a different target location. Selection of a different target location may create standing differences in operation, which standing differences may result in a significant number of unexpected results regarding future operations. However, the illustrative differences, and other computer system specific differences, are addressed in the various embodiments as discussed immediately below.

Many of the interactions between the human and the primary computer system 10 may be programmatically duplicated exactly on the secondary computer system 18 during loading/updating of software under installation. For example, selecting an installation executable, or pressing "OK" on a pop-up window with a query regarding whether the user wishes to continue, may be the same on both the primary and secondary computer systems. However, for parallel installation on a plurality of computer systems, some information or data that is provided may be specific to each particular computer system. For example, each computer system may be assigned a unique network name or a unique IP address. As another example, unexpected results may require a modified installation strategy (e.g., to a different hard drive or different location on a hard drive), thus requiring different data be provided or taken into account. In accordance with the various embodiments, the installation replication software takes into account data specific to the computer systems, both in supplying the data to the secondary computer systems, and recognizing unexpected results. Supplying the data specific to the computer system is addressed first, followed by taking the data specific to the computer system into account when analyzing results.

In accordance with the various embodiments, the installation replication software takes into account data specific to the particular computer system when duplicating interactions on secondary computer systems. For example, in some embodiments, the human 16 provides to the installation replication software a data table that correlates data specific to each computer system. Table 1 below is illustrative of such a data table.

TABLE 1

|  | Primary Computer System | Secondary Computer System | Secondary Computer System | Secondary Computer System |
|---|---|---|---|---|
| Network Name | Server1 | Server2 | Sever3 | Server4 |
| IP Address | 12.34.56.78 | 12.34.56.79 | 12.34.56.80 | 12.34.56.81 |
| Software Key | BR549 | BR550 | BR551 | BR552 |

Thus, though installation as between the primary and secondary computer system may follow the same sequence and result in fulfilling the same overall goal, there may be situations where each computer system uses data specific to that computer system. In accordance with some embodiments, when the human 16 enters data specific to the primary computer system (e.g., the IP address 12.34.56.78), the installation replication software is configured to recognize the data as specific to the primary computer system, and in creating representations of interactions to send to each secondary computer system, the primary computer system either substitutes the data specific to the secondary computer system, or sends such information along with the representation such that the version of the duplication installation software on the secondary computer system knows to use the data specific to the secondary computer system.

In yet still other illustrative embodiments, the task of recognizing data specific to each computer system is assigned to the secondary computer systems. In these embodiments, each secondary computer system 18 is provided a correlation table, such as Table 1. When a representation of an interaction arrives at each secondary computer system, each secondary computer system scans the representation, and before programmatically applying the data specific to the secondary computer system is substituted. In yet still other embodiments, when data specific to the primary computer system 10 is to be entered by human 16, rather than directly entering the data the human may trigger a pop-up or drop-down window of the duplication installation software, select the data type (e.g., computer network name). The duplication installation software then provides to the primary computer system the specific name from the table, and the specific name for each secondary computer system is likewise determined from the table and sent the each secondary computer system.

Likewise with respect to differences caused by unexpected results. If data specific to a computer system is used, or an adjustment is made by the human 16 to the installation on a secondary computer system (e.g., different home location for the software), the system takes into account the differences when analyzing for unexpected results. That is, once an adjustment is made, the system does not indicate such a difference as an unexpected result.

Figure 4:
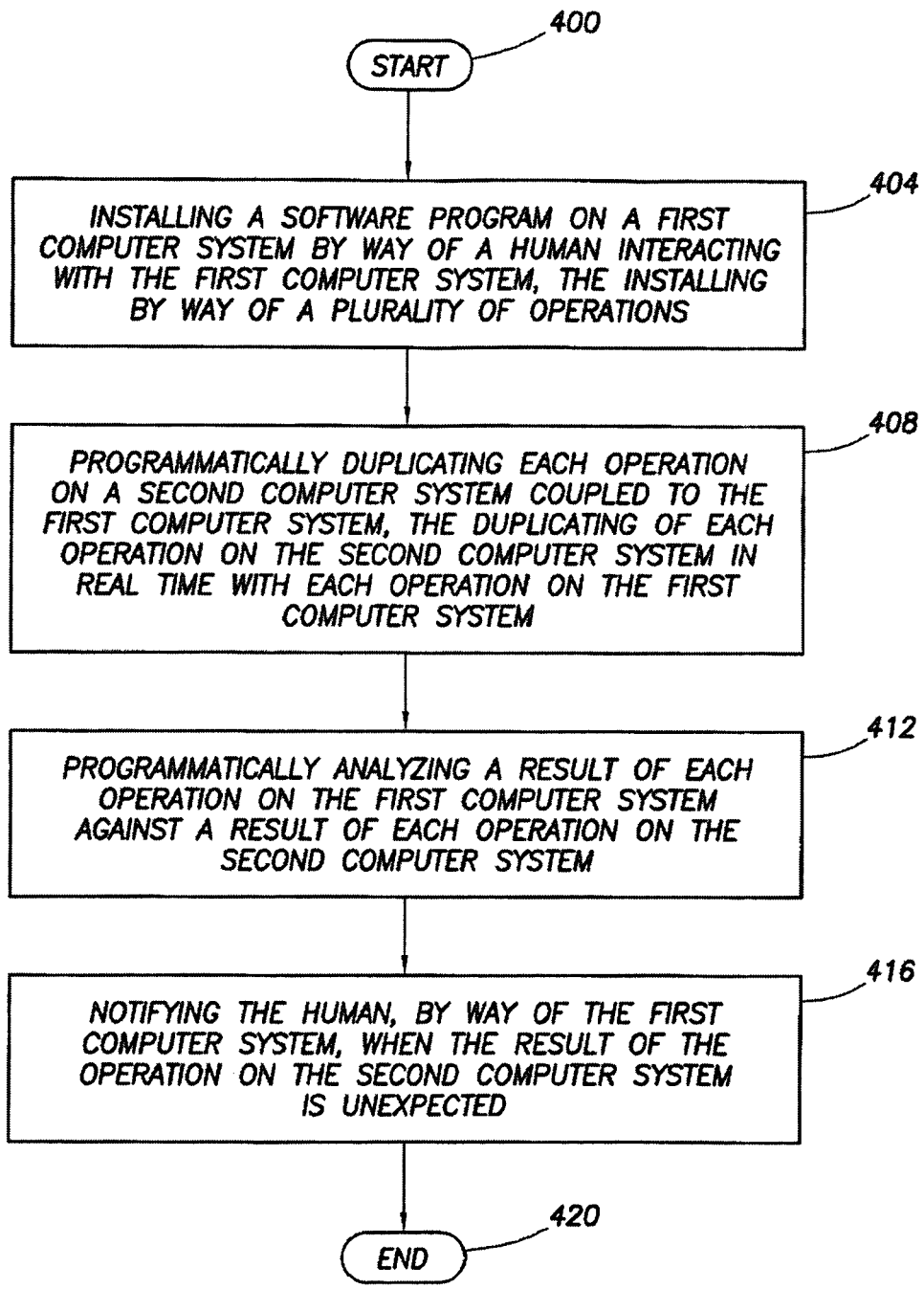
FIG. 4 shows a method in accordance with at least some embodiments.

FIG. 4 illustrates a method in accordance with at least some embodiments. In particular, the method starts (block 400) and proceeds to installing a software program on a first computer system by way of a human interacting with the first computer system, and the installing comprising a plurality of operations (block 404). In some embodiments, the human may interact directly the first computer system (e.g., the first computer system being a desktop computer system having a directly coupled mouse, keyboard and monitor). In other embodiments, the first computer system may be a server in a rack of servers, and thus the human may interact with the first computer system through another computer system. Regardless of whether the interactions is direct or indirect, each operation is then programmatically duplicated on a second computer system coupled the first computer system, the duplication of each operation in real time with each corresponding operation on the first computer system (block 408).

After programmatically duplicating, the illustrative method moves to programmatically analyzing a result of each operation on the first computer system against a result of each operation on the second computer system (block 412). In some embodiments, the second computer system creates a representation of the results of each operation, and the first computer system performs the programmatic analysis. In other embodiments, the first computer system creates a representation of the results of each operation, sends the representation to the second computer system, and the second computer system performs the programmatic analysis. It is noted that, regardless of which computer system performs the analysis, the analysis identifies differences between the first and second computer systems. It is the responsibility of the human 16 to ascertain whether the results on the first computer system are correct under the particular circumstances of the installation.

Regardless of which computer system performs the analysis, the next step in the illustrative method is notifying the human, by way of the first computer system, when the result of the operation on the second computer system is unexpected (block 416), and the method ends (block 420). The notification may take any suitable form. In embodiments where a reduced resolution interface of the user interface of the second machine is shown on the first machine, the reduced resolution interface may be highlighted in some way (e.g., a red box around the thumb-nail). In embodiments where the thumb-nail for the second computer system is not shown, the notification may involve spawning a thumb-nail version of the user interface of the second computer, with or without other delineation (e.g., the red box).

While the method of FIG. 4 is described in reference to a first (or primary) computer system and a second (or secondary) computer, any number of secondary computer systems may likewise participate in the parallel installation of software described by FIG. 4.

From the description provided herein, those skilled in the art are readily able to combine software created as described with appropriate general-purpose or special-purpose computer hardware to create a computer system and/or computer subcomponents in accordance with the various embodiments, to create a computer system and/or computer subcomponents for carrying out the methods of the various embodiments, and/or to create a computer-readable media for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   installing a software program on a first computer system by way of a human interacting with the first computer system during installation of the software program, the installing by way of a plurality of operations;
   while installing the software program on the first computer system, programmatically duplicating, by the first computer system, each operation on a second computer system coupled to the first computer system, the duplicating of each operation on the second computer system in real time concurrently with each corresponding operation on the first computer system;
   programmatically analyzing a result of each operation on the first computer system against a result of corresponding each operation on the second computer system; and
   notifying the human, by way of the first computer system, when the result of the operation on the second computer system is unexpected;
   wherein programmatically duplicating further comprises:
     recording a representation of operations with respect to the software program on the first computer system;
     recognizing whether data specific to the primary computer system is being used during an operation;
     for an operation for which no data specific to the first computer system is used during an operation, sending to the second computer system the representation of that operation;
     for an operation for which data specific to the first computer system is used during an operation, sending a value specific to the second computer system to the second computer system; and
     programmatically applying, on the second computer system, each representation and data specific to the second computer.

2. The method of claim 1 wherein programmatically analyzing further comprises:
   creating the representation of results of each operation by the first computer system;
   creating a representation of results of each operation by the second computer system;
   the programmatically analyzing performed by at least one selected from the group consisting of: the first computer system; and the second computer system.

3. The method of claim 1 further comprising:
   correcting, by the human from the first computer system, the unexpected result of the operation on the second computer system;
   refraining from notifying the human when a future result of operations on the second computer system differs from a corresponding future result on the first computer system for reason of the correcting.

4. A system comprising:
   a primary computer system;
   a secondary computer system coupled to the primary computer system by way of a computer network;
   the primary computer system is configured to record representations of interactions between a human and software under installation on the primary computer system, and the primary computer system is further configured to send representations of the interactions to the secondary computer system;
   the secondary computer system is configured to receive the representations of interactions and, while the software is being installed on the primary computer system apply, in real time with the interactions on the primary computer system, the representations of the interactions to a duplicate copy of the software under installation on the secondary computer system;
   the system is configured to analyze a result of interactions of the human with the software under installation against a respective result of application of the representations of the interactions to the duplicate copy of the software under installation; and
   the system is configured to alert the human by way of the primary computer system when results as between the primary and the secondary computer system indicate an unexpected result;
   wherein when the primary computer system is to send representations of the interactions to the secondary computer system, the primary computer system is to recognize use of data specific to the primary computer system and to send to the secondary computer system a value indicative of data specific to the secondary computer system.

5. The system of claim 4 wherein when the system alerts the human, the system is further configured to alert the user when results on the secondary computer system are different than results on the primary computer system for reasons other than data specific to the primary or secondary computer system.

6. The system of claim 4 wherein the primary and secondary computer systems are configured to enable the human, by way of the primary computer system, to make adjustments to the installation of the duplicate copy of the software under installation after an alert.

7. The system of claim 4 wherein when the system analyzes, the system is further configured to:
   create, by the primary computer system, a representation of results of each operation on the primary computer system;
   create, by the secondary computer system, a representation of results of each operation on the secondary computer system; and
   analyze the representation of the results of the first computer system against the representation of results of the secondary computer system, the analysis performed by at least one selected from the group consisting of: the primary computer system; and the secondary computer system.

8. A non-transitory computer-readable media storing software that, when executed by a processor, causes the processor to:
- record an interaction of a human with a program being installed on a first computer system in which the processor resides;
- while the program is being installed on the first computer system, send, in real time with the interaction, a representation of each interaction for an operation that does not use data specific to the computer system to a second computer system coupled to the processor by way of a computer network;
- recognize use of data specific to the first computer system during an operation and send a value indicative of data specific to the secondary computer system to the second computer system;
- determine a result of the interaction between the human and the program being installed on the first computer system; and
- alert the human if the result of the interaction in comparison to a result of performance of the representation of the interaction on the second computer system indicates an occurrence of an unexpected result on the second computer system.

9. The non-transitory computer-readable media of claim 8 wherein, prior to when the processor alerts the human, the program further causes the processor to:
- receive from the second computer system an indication of a result of applying the representation of the interaction to a duplicate program being installed on the second computer system;
- evaluate a relationship between the indication of the result received from the second computer system and the result of the interaction between the human and the program being installed.

10. The non-transitory computer-readable media of claim 8 wherein, prior to when the processor alerts the human, the program further causes the processor to:
- send to the second computer system an indication of the result of the interaction between the human and the program being installed;
- receive from the second computer system an indication of a relationship between the result of the interaction between the human and the program being installed by the processor and a result of applying the representations of the interaction to a duplicate copy of the software being installed on the second computer system.

11. The non-transitory computer-readable media of claim 8 wherein when the processor alerts the human, the program further causes the processor to alert the human when results on the second computer system are different than results on the first computer system for reasons other than data specific to the second computer system.

12. The non-transitory computer-readable media of claim 8 wherein the software is to cause the processor to generate a user interface which contains a graphical representation of a user interface of the second computer system.

13. The non-transitory computer-readable media of claim 12 wherein the software is to cause the processor to alter the graphical representation of the user interface of the second computer system upon determination of an unexpected result.

* * * * *